(12) United States Patent
Elsen (10) Patent No.: US 12,193,446 B2
(45) Date of Patent: Jan. 14, 2025

(54) DEVICE FOR HOLDING FOODSTUFFS

(71) Applicant: coox GmbH, Wuppertal (DE)

(72) Inventor: Marc Elsen, Wuppertal (DE)

(73) Assignee: COOX GMBH, Wuppertal (DE)

( * ) Notice: Subject to any disclaimer, the term of this patent is extended or adjusted under 35 U.S.C. 154(b) by 0 days.

(21) Appl. No.: 17/752,559

(22) Filed: Sep. 22, 2022

(65) Prior Publication Data

US 2024/0099312 A1    Mar. 28, 2024

(51) Int. Cl.
  *A21B 3/13*    (2006.01)
  *A47J 37/01*    (2006.01)

(52) U.S. Cl.
  CPC .............. *A21B 3/131* (2013.01); *A21B 3/138* (2013.01); *A47J 37/01* (2013.01)

(58) Field of Classification Search
  CPC ........... A21B 3/131; A21B 3/138; A47J 37/01
  USPC .............................................. 220/573.1, 62.1
  See application file for complete search history.

(56) References Cited

U.S. PATENT DOCUMENTS

| | | | | |
|---|---|---|---|---|
| 6,684,760 | B1 * | 2/2004 | Rajusth | A21B 3/131 |
| | | | | 99/449 |
| 2006/0169691 | A1 * | 8/2006 | Rothschild | A45C 11/20 |
| | | | | 220/7 |
| 2008/0063760 | A1 * | 3/2008 | Raymond | B65D 81/3453 |
| | | | | 426/531 |
| 2010/0133142 | A1 * | 6/2010 | Avery | A21B 3/131 |
| | | | | 206/557 |
| 2010/0288779 | A1 * | 11/2010 | Avery | A21B 3/131 |
| | | | | 220/666 |
| 2012/0104006 | A1 * | 5/2012 | Avery | A21B 3/131 |
| | | | | 220/666 |

(Continued)

FOREIGN PATENT DOCUMENTS

| | | | | |
|---|---|---|---|---|
| DE | 102016123167 A1 | * | 5/2018 | ............. A21B 3/131 |
| DE | 102021108537 A1 | * | 10/2022 | |
| JP | 2022063516 A | * | 4/2022 | |

*Primary Examiner* — J. Gregory Pickett
*Assistant Examiner* — Niki M Eloshway
(74) *Attorney, Agent, or Firm* — LUCAS & MERCANTI, LLP; Peter J. Phillips (57) ABSTRACT

The invention relates, inter alia, to a device (10) for holding foodstuffs in the manner of a cooking or baking mold (11), comprising a bottom wall (12) and a plurality of side walls (13a, 13b, 13c, 13d), wherein the side walls (13a, 13b, 13c, 13d) are displaceable from a rest position (14), in which they lie flat, relative to the bottom wall (12) into an upright working position (15), and wherein a mat-like portion (16a, 16b, 16c, 16d) is arranged between each two side walls (13a, 13b) and forms an overlap (20) when the side walls (13a, 13b, 13c, 13d) are in the working position (15). The special feature of the invention consists, inter alia, in the fact that the bottom wall (12) and the side walls (13a, 13b, 13c, 13d) are made of metal, wherein the bottom wall (12) along its edge portions (21a, 21b, 21c, 21d) and the side walls (13a, 13b, 13c, 13d) along their edge portions (22a, 22b, 22c, 22d) bordering the bottom wall (12) are covered with a plastics compound (23), which is arranged on the outer side (39, 40a, 40b, 40c, 40d) of the walls and which connects the edge portions (22a, 22b, 22c, 22d) of the side walls (13a, 13b, 13c, 13d) to the edge portions (21a, 21b, 21c, 21d) of the bottom wall (12), wherein the inner sides (25, 26a, 26b, 26c, 26d) of the walls (12, 13a, 13b, 13c, 13d) are kept free of plastics compound (23).

14 Claims, 7 Drawing Sheets

(56) References Cited

U.S. PATENT DOCUMENTS

2013/0119068 A1\* 5/2013 Friedl .................... B23P 11/00
 220/573.1
2018/0022529 A1\* 1/2018 Tye ........................ B65D 5/563
 206/557

\* cited by examiner

DEVICE FOR HOLDING FOODSTUFFS

The invention relates to a device for holding foodstuffs according to the preamble of claim 1.

A device having the features of the preamble of claim 1 is known from DE 10 2016 123 167 A1.

The known device consists of a flat plastics mat which can be converted into a cooking or baking mold by folding up the side walls and locking them in the upright position. After use, as a result of unlocking, a flat state can be re-established, in which the mold can be permanently stored in a space-saving manner.

The known mold has proven itself in use.

Starting from the device described at the outset having the features of the preamble of claim 1, the object of the invention is to develop the mold in such a way that it is assimilated to conventional, metal cake molds and yet can be stored and packed away in a space-saving manner.

The invention achieves this object with the features of claim 1, in particular those of the characterizing part, and is accordingly characterized in that the bottom wall and the side walls consist of metal, wherein the bottom wall along its edge portions and the side walls along their edge portions bordering the bottom wall are covered with a plastics compound, which is arranged on the outer side of the walls and which connects the edge portions of the side walls to the edge portions of the bottom wall, wherein the inner sides of the walls are kept free of plastics compound, and wherein a side wall in its working position rests in abutment against the bottom wall and against each adjacently arranged side wall, so that the device in its use position forms an inner face provided continuously by metal portions.

The principle of the invention lies fundamentally in designing the device with a metal bottom wall and with a plurality of, in particular four, metal side walls. The walls are partially or completely covered on their outer with a plastics compound, for example with a silicone rubber. The invention particularly includes a situation when the bottom wall and the side walls are only covered by the plastics compound along their respective edge regions bordering one another, so that a formation of strands of plastics compound is produced, consequently the plastics compound forms a kind of skeletal structure.

The special feature is that the bottom wall and the side walls are kept completely free of the plastics compound on their inner faces. Thus, when the side walls are in the working position, it is possible for one metal side wall to rest in abutment against the metal bottom wall. There is therefore contact between metal abutting edges or metal abutting faces. It is also provided in accordance with the invention that a side wall in its working position rests in abutment against each adjacent side wall in turn in its working position. The edges or narrow-side faces of the metal walls thus contact each other.

The entire inner face of the mold obtained in this way, when the mold is in the use position, and thus all side walls are erected into their respective working positions, is formed by a continuous metal surface. In particular, there is no plastics compound in the various bordering regions, that is to say in the various corner regions. Clearances or cavities can also be avoided. Particularly advantageously, the side walls rest with their narrow-side walls on the inner face of the bottom wall.

The invention recognizes that, in order to provide a permanently functioning pivotability of the side walls relative to each other which also allows a longevity of the device, it is sufficient if the plastics compound is only applied to the outer side of the walls. In this respect, the device according to the invention differs significantly from the exemplary embodiment of FIG. 17 of US 2010/0133142 A1, in which beads of plastics compound are provided along mutually bordering regions of each wall and the next.

In this respect, the device according to the invention provides a mold having an interior that is similar to the interior of a conventional all-metal cake mold or corresponds thereto completely or almost completely. The side walls are lockable in their upright working position, but can also be released or unlocked again. Following release of the locking, the mold can be converted back in a state lying flat. In the state of the device in which it lies flat, it can be stored in a space-saving manner.

The device according to the invention thus allows for space-saving storage, although the inner face of the mold is provided continuously by metal portions.

Due to the continuous metal inner faces of the mold in the use position, the device according to the invention can in this respect display a heat conduction behavior and also a baking behavior or cooking behavior which corresponds identically to the cooking or baking behavior of conventional, all-metal cake molds or loaf molds. In this respect, in particular traditional, conventional recipes can be followed unchanged, and lead to identical results.

In particular, the invention relates to a device having a rectangular bottom wall and four side walls. However, the invention also comprises devices having more than four side walls. For example, a device according to the invention can have five side walls, wherein in this exemplary embodiment the bottom wall is formed, for example, in the manner of a pentagon. Alternatively, the device can have, for example, six side walls, wherein the bottom wall is formed in the manner of a hexagon. More generally, the device can have n side walls, wherein the bottom wall forms a polygon with n peripheral portions.

In particular, the device comprises embodiments in which the upright position of a side wall assumes a 90° position relative to the bottom wall. However, the invention also comprises exemplary embodiments in which the side wall in the working position assumes an inclination other than a 90° inclination relative to the bottom wall.

The device according to the invention comprises a mat-like portion between each two side walls. The mat-like portion can form an overlap when the side walls are in the working position. In particular, this achieves complete sealing of the mold. In this way, even low-viscosity foodstuffs, for example low-viscosity dough mixtures or low-viscosity cooking mixtures, can be accommodated without liquid escaping from the device.

The invention recognizes that, in contrast to the devices of the prior art, it is sufficient if the plastics compound is only arranged along the outer sides of the walls to be movably connected to each other. Especially the corner regions or edge regions or connection regions of the wall elements are highly critical, as point loads and stress peaks often form here due to the frequent bending processes and the forces occurring there. The invention recognizes that the required stability and durability—in particular also taking into account manufacturing processes and manufacturing tolerances—can also be achieved if the plastics compound is only molded onto the outer faces of the walls.

According to a particularly advantageous embodiment of the invention, the mat-like portion is formed in a manner bonded integrally to the plastics compound.

According to the invention, the bottom wall is covered with a plastics compound along its edge portions on its outer side. The side walls are also covered with a plastics compound along their edge portions, with which they each border a bottom wall. The plastics compound is arranged exclusively on the outer side of the walls. The plastics compound connects the edge portions of the side walls to the edge portions of the bottom wall. The inner side of the walls, i.e. the inner side of the bottom wall, but also the inner side of the side walls, are kept completely free of plastics compound.

According to the invention, it is provided that a side wall in its working position rests in abutment against the bottom wall. According to the invention, it is further provided that a side wall in its working position also rests in abutment against its adjacent side wall. In this way, when the device is in its use state, it can form an inner face that is provided completely continuously by only metal portions.

The plastics compound thus does not come into contact with the received foodstuffs during the cooking or baking process. Only metal portions come into contact with the foodstuffs.

In this way, an optimized temperature distribution can be achieved. In particular, baking processes can be carried out with the device according to the invention that correspond to the baking behavior of conventional, all-metal cake molds due to identical heat conduction and an identical temperature behavior and temperature distribution behavior.

According to an advantageous embodiment of the invention, the plastics compound is provided by a silicone compound, in particular by a silicone rubber, or comprises a silicone compound, in particular a silicone rubber. This allows recourse to conventional materials for the manufacture of a device according to the invention.

According to a further advantageous embodiment of the invention, when the device is in the state in which it lies flat, an inner face of an edge portion of a side wall has a step-like offset relative to an inner face of the adjacent edge portion of the bottom wall.

This allows an optimized structural design of the connection region with the aim of a particularly durable design of the connection region between a bottom wall and each side wall.

According to a further advantageous embodiment of the invention, when the device is in the state in which it lies flat, a groove-shaped gap is arranged between a narrow side of an edge portion of a side wall and a narrow side of the bottom wall along the adjacent edge portion of the bottom wall. This design allows the side wall to be moved particularly frequently into the working position and back into the rest position. Due to the gap, the local stress peaks occurring in the bending regions of the plastics compound can be kept small. This ensures a long service life of the device.

According to a further advantageous embodiment of the invention, the side wall in its use position stands with its narrow side on the inner face of the bottom wall. This exemplary embodiment offers the possibility of a continuous inner face of the mold in the use position. In particular, this embodiment allows metal faces or metal edges to rest against each other in abutment.

According to a further advantageous embodiment of the invention, a side wall in its use position stands with its narrow side on the inner face of an adjacently arranged side wall, the latter being in its use position. This exemplary embodiment offers the possibility of a continuously formed inner face of the mold in the use state. In particular, this embodiment allows metal faces or metal edges to rest against each other in abutment.

According to a further advantageous embodiment of the invention, a narrow-side face of the bottom wall is kept free of plastics compound. This makes it possible to keep the connection region between the side wall and the bottom wall completely free of plastics compound even when the side wall is in the working position.

According to a further embodiment of the invention, a narrow-side face of the side wall is kept free of plastics compound along its edge portions bordering the bottom wall. This embodiment offers the possibility that even when the device is in the working position, the connection region between the side wall and the bottom wall remains completely free of plastics compound.

According to a further advantageous embodiment of the invention, a narrow-side face of the side wall is kept free of plastics compound along its edge portions bordering an adjacent side wall. This offers the possibility of a continuous metal transition along the inner faces of the device in the region between a side wall and an adjacent side wall.

According to a further advantageous embodiment of the invention, locking elements are integrally molded on the outer side of at least two of the side walls. Particularly advantageously, two locking elements are integrally molded on each of the at least two side walls. This allows the mold according to the invention to be designed in such a way that the inner face of the mold in the use position is provided with metal inner faces up to the upper edge of the side walls. Furthermore, it is possible to provide the locking elements from the plastics compound itself. This allows a particularly simple design and manufacture of the device according to the invention.

According to a further advantageous embodiment of the invention, the locking elements are provided by the plastics compound. This embodiment offers the possibility of forming the locking elements in a manner bonded integrally to the plastics compound in one piece. This allows for particularly simple manufacture.

According to a further advantageous embodiment of the invention, the locking elements are formed by projections, for example by in particular pin-shaped, for example mushroom-like projections. This offers the possibility of a particularly simple construction of the device according to the invention.

According to a further advantageous embodiment of the invention, counter-locking elements for the locking elements are arranged on the mat-like portions. This enables a particularly compact design and simple construction.

According to a further advantageous embodiment of the invention, the counter-locking elements are formed by recesses, for example by keyhole-like recesses. This allows for a particularly simple and intuitively easy locking of the locking elements and of the counter-locking elements to each other as well as unlocking thereof.

According to a further aspect, the invention relates to a device according to claim 14.

The special feature of the device according to claim 14 is that the bottom wall and the side walls of the device consist of glass or of ceramic material.

All advantages and explanations described for the invention according to claims 1 to 14 apply analogously to the invention according to claim 14. Insofar as variants have been described for the invention according to claims 1 to 13, these variants—insofar as no technical contradictions exist—are also comprised by the invention according to claim 14. In order to avoid repetition, reference is made analogously to the comments provided above and hereinafter.

Insofar as devices with walls of metal are described in this patent application, the explanations, descriptions and advantages in this respect also apply equally or in adapted form to devices according to claim 14, in which the walls consist of glass or ceramic material.

Further advantages of the device according to the invention will become apparent from the dependent claims (not cited) and from the following description of the exemplary embodiments shown in the drawings, in which:

Exemplary embodiments of the invention are described by way of example in the following figure description, also with reference to the drawings. For the sake of clarity, identical or comparable parts or elements or regions are denoted by identical reference signs, sometimes with the addition of lowercase letters, even where different exemplary embodiments are concerned.

Within the scope of the invention, features which are described, illustrated or disclosed only in relation to one exemplary embodiment may also be provided in any other exemplary embodiment of the invention. Such modified exemplary embodiments—even if not shown in the drawings—are included by the invention.

All disclosed features are essential to the invention in their own right. The disclosure of the application hereby also includes the full content of the disclosure of the associated priority documents (copy of the prior application) as well as of the cited documents and the described prior art devices, also for the purpose of incorporating individual features or several features of the subject matter disclosed therein in one or more claims of the present application. Such modified exemplary embodiments are also comprised by the invention, even if they are not shown in the drawings.

Figure 1:
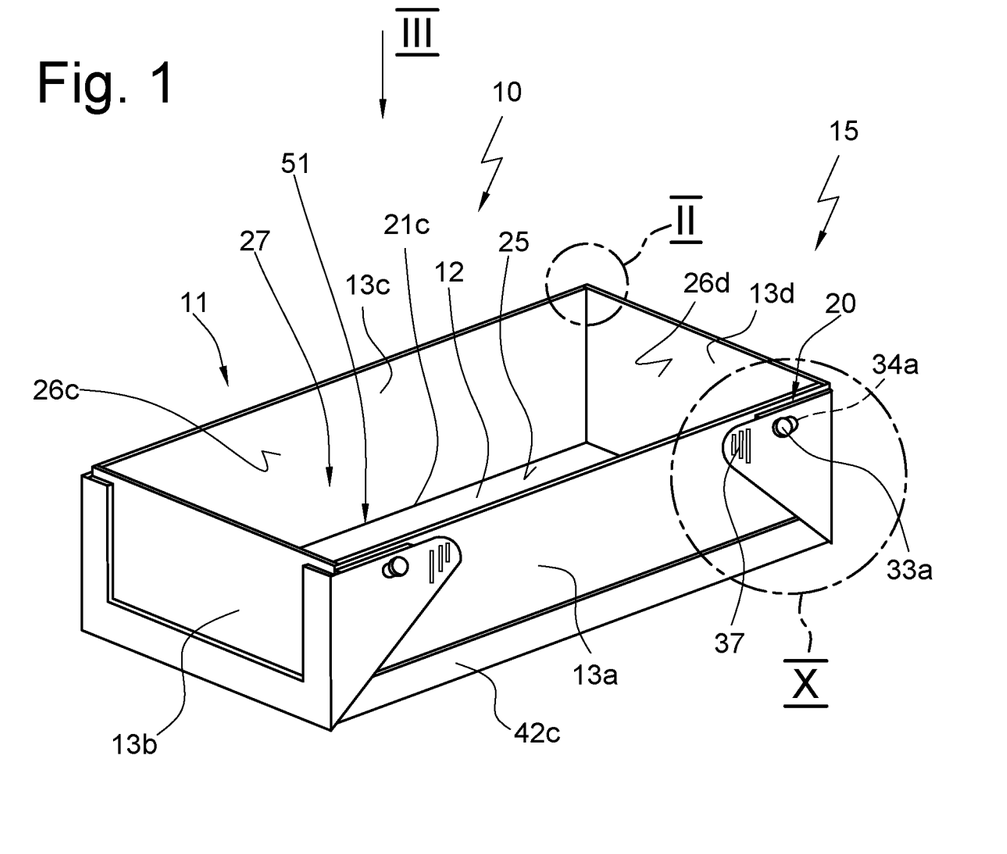
FIG. 1 shows, in a schematic, perspective view, an exemplary embodiment of a device according to the invention in the use position, wherein all side walls of the device are in their working position and locked together.

An exemplary embodiment of a device according to the invention is denoted in its entirety in the figures by the reference sign 10. FIG. 1 shows the mold 11, which is a baking mold or a cooking mold, in a use position.

The device 10 comprises a bottom wall 12 and four side walls 13a, 13b, 13c, 13d. According to FIG. 1, all side walls 13a, 13b, 13c, 13d are in the working position 15.

Figure 3:
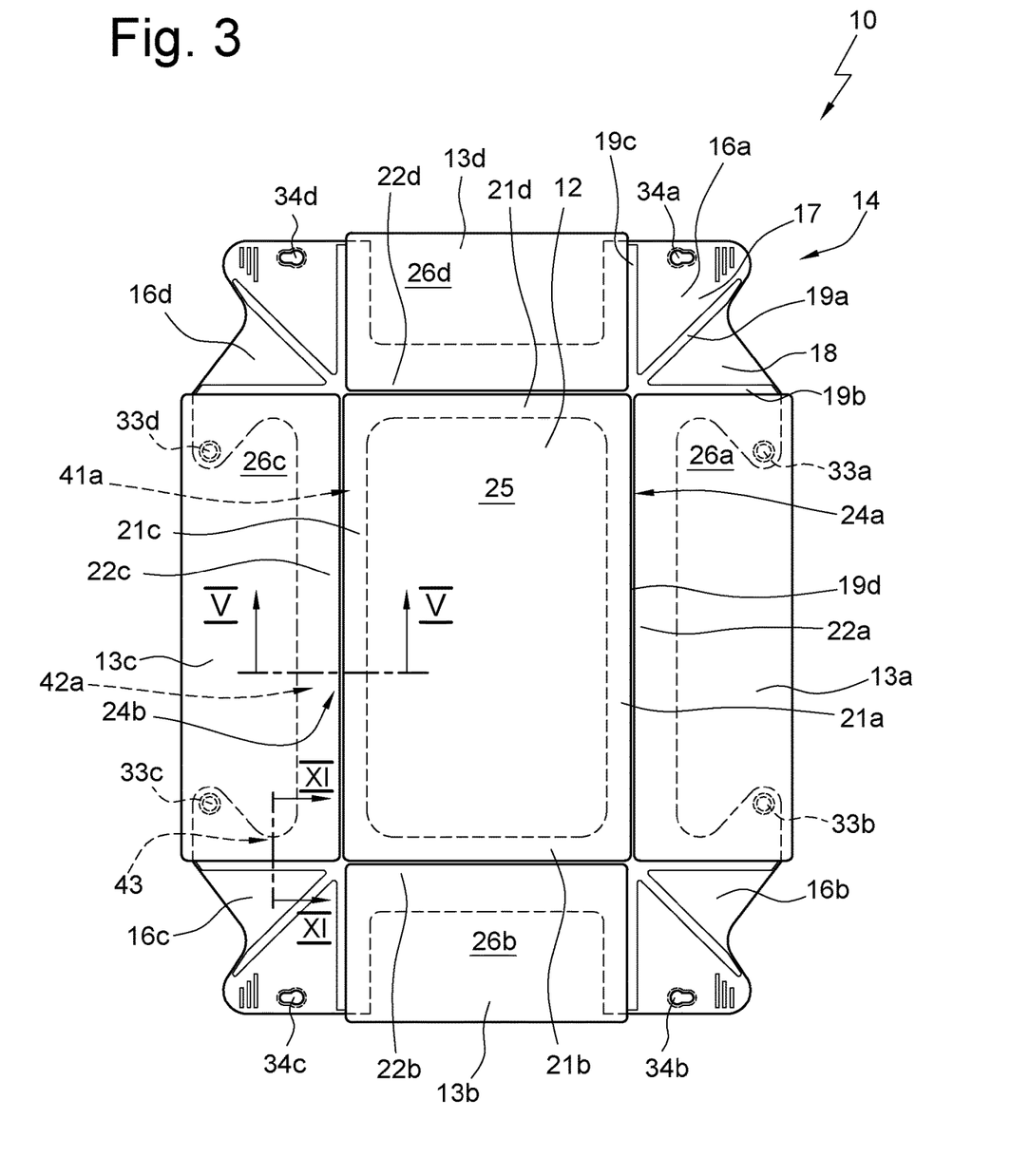
FIG. 3 shows a schematic, perspective view of the device of FIG. 1 in plan view according to view arrow III in FIG. 3 in a state lying flat to illustrate the inner faces of the bottom wall and side walls.

As best shown in FIG. 3, the device 10 can assume a state in which it lies flat. The four side walls 13a, 13b, 13c, 13d are then oriented parallel to the bottom wall 12 and are in their respective rest positions 14. The bottom wall 12 and each of the side walls 13a, 13b, 13c, 13d are rectangular.

Each of the walls 12, 13a, 13b, 13c, 13d consists of metal.

Advantageously, each metal wall 12, 13a, 13b, 13c, 13d can be provided with a coating (not shown in the figures) that is conventional for cooking or baking purposes in the sense of a non-stick coating, for example a Teflon coating.

FIG. 3 shows that the faces 25, 26a, 26b, 26c, 26d of the bottom wall 12 and the side walls 13a, 13b, 13c, 13d facing the viewer of FIG. 3 are kept completely free. In particular, FIG. 3 shows that there is no plastics material on these inner faces 25, 26a, 26b, 26c, 26d.

The faces 25, 26a, 26b, 26c, 26d of the metal walls 12, 13a, 13b, 13c, 13d facing the viewer of FIG. 3 form the inner sides or inner faces 25, 26a, 26b, 26c, 26d of the device 10 when it is in the use position according to FIG. 1.

When the device 10 is in the use position according to FIG. 1, the sum of the inner face 25 of the bottom wall 12 and of the inner faces 26a, 26b, 26c, 26d of the side walls 13a, 13b, 13c, 13d provides the inner face 27 of the mold 11.

Figure 4:
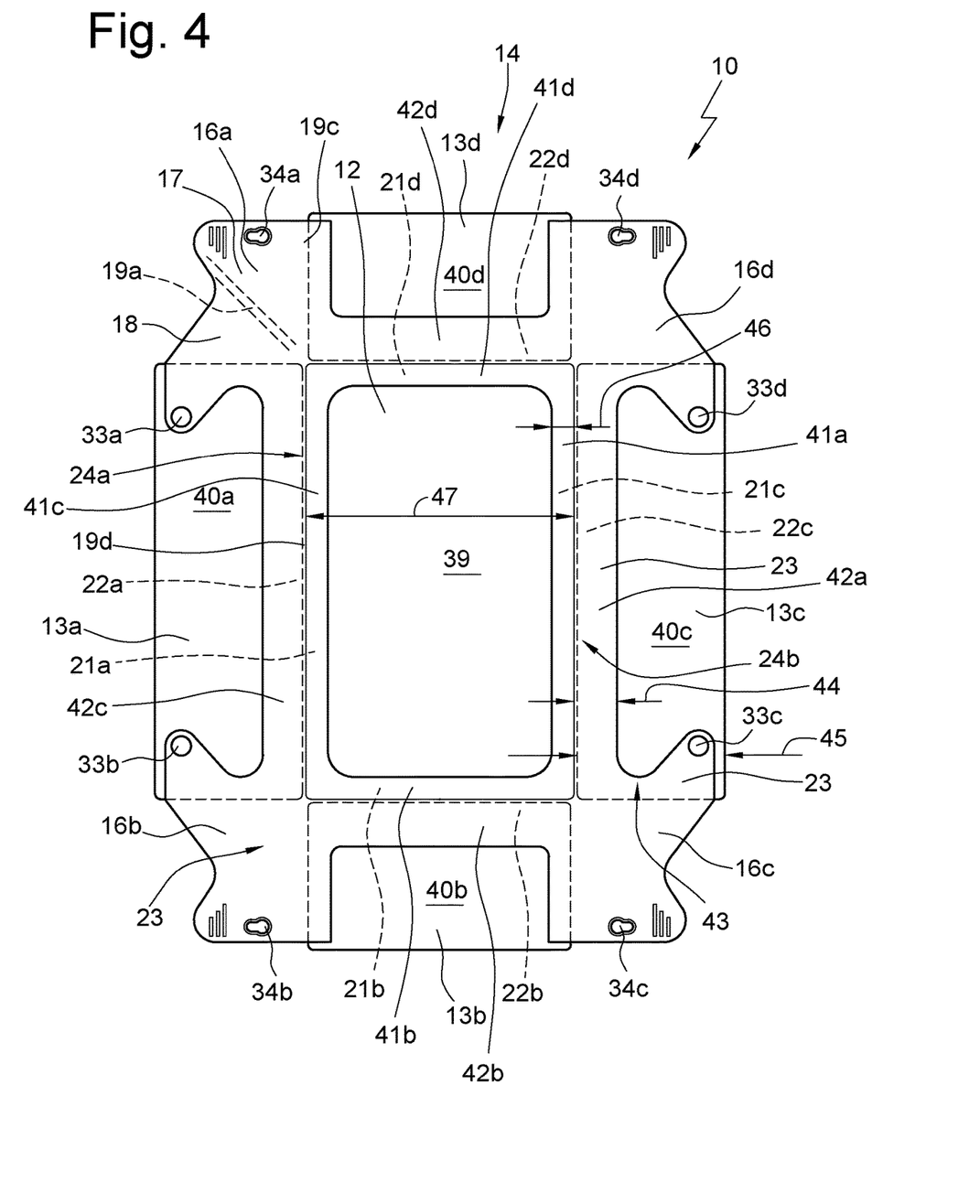
FIG. 4 shows the device of FIG. 3 in a schematic rear view to illustrate the plastics compound connecting the walls together, the plastics compound forming a kind of skeletal structure.

The rear view of the device 10 of FIG. 3 is shown in FIG. 4: Here, the contours of the bottom wall 12 and of the side walls 13a, 13b, 13c, 13d are indicated. It can be seen that the outer faces or outer sides 39 of the bottom wall 12 and 40a, 40b, 40c, 40d of the side walls 13a, 13b, 13c, 13d facing the viewer of FIG. 4 are covered with a plastics compound 23.

The plastics compound 23 can comprise a silicone compound, in particular a silicone rubber compound, as known from conventional flexible cooking and baking molds and from the kitchen and baking sector.

The plastics compound 23 is molded or cast onto the metal outer faces 39, 40a, 40b, 40c, 40d of the walls 12, 13a, 13b, 13c, 13d.

The plastics compound 23 forms a kind of skeletal structure. In the state of the device 10 in which it lies flat according to FIG. 4, the plastics compound 23 is provided by a kind of mat with a complicated, approximately #-shaped (=hashtag-shaped) geometric contour.

The plastics compound 23 comprises four mat-like portions 16a, 16b, 16c, 16d, each arranged between two side walls 13a, 13b, 13c, 13d. The mat-like portions 16a, 16b, 16*c*, 16*d* are thus arranged in one each of the corner regions of the device 10 according to FIG. 4.

FIGS. 3 and 4 illustrate that, for example, the mat-like portion 16*a* of the device 10 comprises a first triangular region 17 and a second triangular region 18, wherein the two regions 17, 18 are connected to each other along a predetermined bending line 19*a*.

The four mat-like portions 16*a*, 16*b*, 16*c*, 16*d* are connected to the bottom wall 12 and to the side walls 13*a*, 13*b*, 13*c*, 13*d* via strand-like regions 41*a*, 41*b*, 41*c*, 41*d*, 42*a*, 42*b*, 42*c*, 42*d*, 43.

FIG. 4 shows that each of the side walls 13*a* 13*b*, 13*c*, 13*d* comprises a strand 42*a*, 42*b*, 42*c*, 42*d* of plastics compound 23. In particular, the plastics compound 23 is arranged along the edge regions 22*a*, 22*b*, 22*c*, 22*d* of the side walls 13*a*, 13*b*, 13*c*, 13*d* running along the edge regions 21*a*, 21*b*, 21*c*, 21*d* of the bottom wall 12.

In the exemplary embodiment, the plastics compound 23 is arranged in the form of strands 42*a*, 42*b*, 42*c*, 42*d* along the edge regions 22*a*, 22*b*, 22*c*, 22*d* of the side walls 13*a*, 13*b*, 13*d*.

In the exemplary embodiments shown in the drawings, the strands 42*a*, 42*b*, 42*c*, 42*d* have only a small width. In other exemplary embodiments, not shown in the drawings, the width of the strands 42*a*, 42*b*, 42*c*, 42*d* can also be smaller or greater.

For example, according to FIG. 4, the strand 42*a* has a width 44 that is significantly smaller than the width 45 of the side wall 13*c*. For example, the width 44 of the strand 42 may comprise about ½₀ to ⅕ of the width 45 of the side wall 13*a*, 13*b*, 13*c*, 13*d*.

The plastics compound 23 also extends along the edge portions 21*a*, 21*b*, 21*c*, 21*d* of the bottom wall 12.

Again, the plastics compound 23 is formed on the bottom wall 12 in the form of strands 41*a*, 41*b*, 41*c*, 41*d*.

All strands 42*a*, 42*b*, 42*c*, 42*d*, 41*a*, 41*b*, 41*c*, 41*d* are connected to each other. For example, the strand 42*a* is connected in on piece in an integrally bonded manner to the strand 41*a*.

The plastics compound 23 is connected to the outer side 39 of the bottom wall 12 along the strand 41*a*. The strand 41*a* has a width 46 that is much smaller than the width 47 of the bottom wall 12. In particular, the width 46 of the strand 41*a* can be ¹⁄₁₀₀ to ⅓ of the width 47 of the bottom wall 12.

The mat-like portions 16*a*, 16*b*, 16*c*, 16*d* are also attached to the corresponding edge region of the relevant bordering side wall 13*a*, 13*b*, 13*c*, 13*d* via corresponding material regions or strands. For example, in FIGS. 3 and 4, the material region by which the mat-like portion 16*c* is attached to the corresponding side wall 13*c* is denoted by the reference sign 43.

In the exemplary embodiment shown in the drawings, the plastics compound 23 is a unitary, continuous element molded or cast on in one piece from a homogeneous material. The invention also includes a scenario in which the plastics compound 23 consists of two or more components which are attached or molded on one after the other, that is to say successively, or are bonded together. The invention also comprises a scenario in which the plastics compound 23 consists of two or more different components which are applied, for example, in a two-component spraying process. For example, the invention also comprises a scenario in which the mat-shaped portions 16*a*, 16*b*, 16*c*, 16*d* consist of a different material, that is to say a different plastics compound, than the strands 41*a*, 41*b*, 41*c*, 41*d*, 42*a*, 42*b*, 42*c*, 42*d*.

The device 10 has a plurality of predetermined bending lines 19.

Mention has already been made above of a predetermined bending line 19*a* between a first triangular region 17 and a second triangular region 18.

In addition, between each side wall 13*a*, 13*b*, 13*c*, 13*d* and the relevant bordering triangular region 17, 18, a predetermined bending line is provided: For example, a predetermined bending line 19*b* is indicated between the side wall 13*a* according to FIG. 3 and the second triangular region 18.

Lastly, as shown in FIG. 3, a predetermined bending line 19*c* is indicated between the side wall 13*d* and the first triangular region 17.

Also, as shown in FIG. 3, a predetermined bending line 19*d* is indicated between the side wall 13*a* and the bottom wall 12.

For the sake of completeness only, it should be noted that corresponding predetermined bending lines 19*a*, 19*b*, 19*c*, 19*d* are equally arranged also along the remaining mat-like portions 16*b*, 16*c*, 16*d* and between each side wall 13*b*, 13*c*, 13*d* and the bottom wall 12.

The portions or elements bordering the predetermined bending regions 19*a*, 19*b*, 19*c*, 19*d* are able to perform a relative movement along the predetermined bending lines 19*a*, 19*b*, 19*c*, 19*d*.

Figure 7:
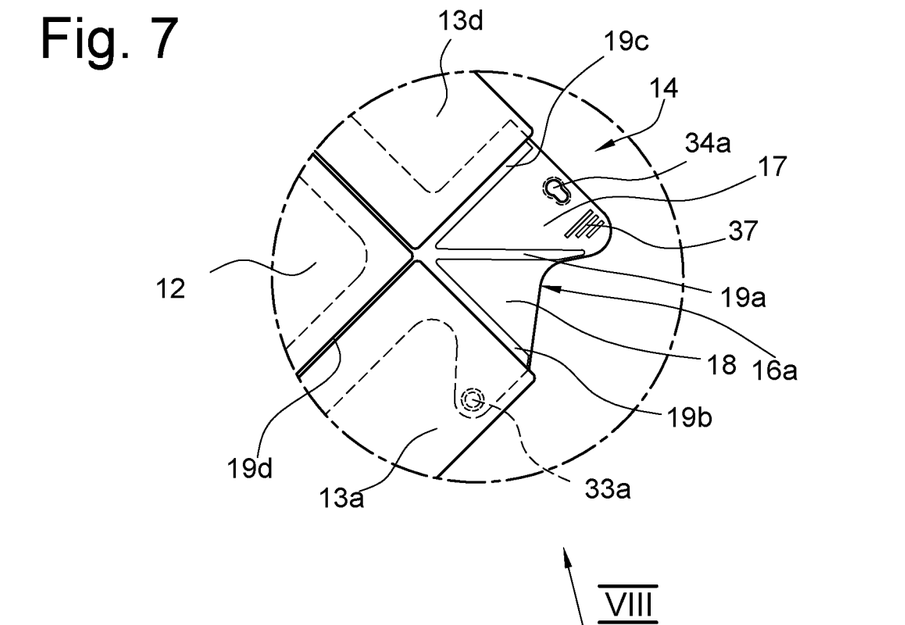
FIG. 7 shows, in a cutaway, schematic, enlarged view, a detail of the upper right corner region of the device with respect to FIG. 3, rotated approximately 45° clockwise in the paper plane.

The displacement of the side walls 13*a*, 13*b*, 13*c*, 13*d* from the rest position according to FIG. 7 into the working position according to FIG. 10 will be explained on the basis of FIGS. 7 to 10:

With respect to FIG. 3, FIG. 7 shows an upper right corner region of the device 10 in the state in which it lies flat. FIG. 7 shows the upper right corner region of FIG. 3 rotated clockwise through 45°.

Figure 8:
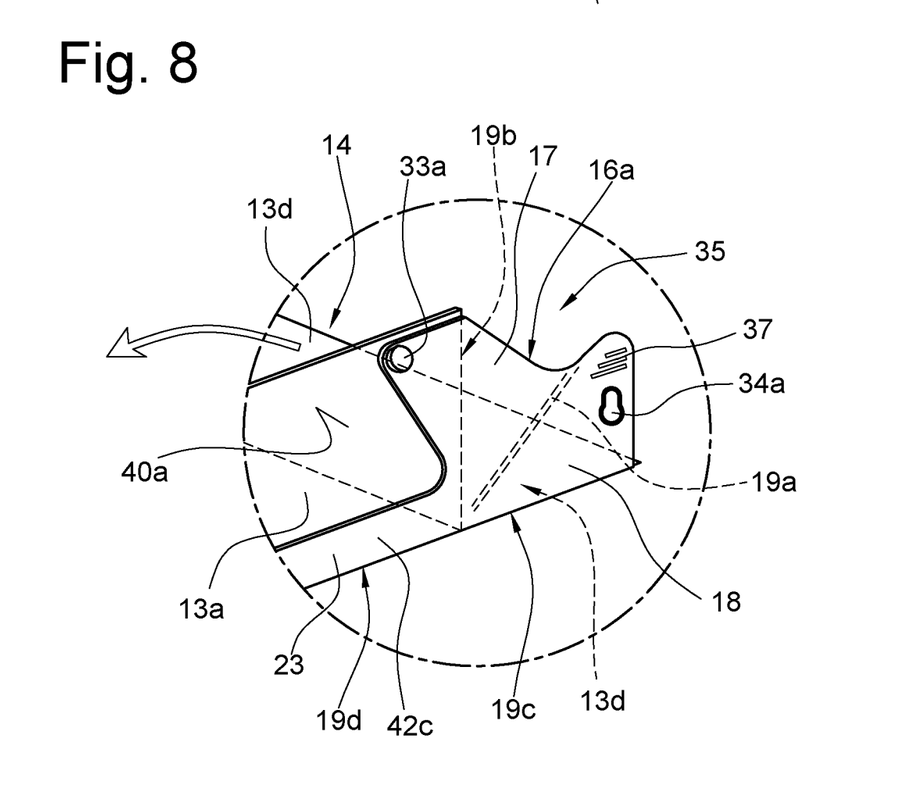
FIG. 8 shows the corner region of the device according to FIG. 7 in a schematic, perspective view, approximately according to the view arrow VIII in FIG. 7, wherein the longitudinal side wall facing the viewer of FIG. 8 has already been folded up into its working position, so that the device assumes a first intermediate state.

FIG. 8 shows a schematic view of a first intermediate position 35. Here, the rear side wall 13*d*, as seen in the viewing direction, is still in the state in which it lies flat according to FIG. 7, whereas the front side wall 13*a* has been displaced through about 90° from the position in which it lies flat according to FIG. 7, out of the paper plane of FIG. 7. FIG. 8 shows this first intermediate position 35, in which the front side wall 13*a* assumes its working position, in a perspective view.

The side wall 13*a* has been pivoted here about the predetermined bending axis 19*d*.

Starting from FIG. 7, the mat-like portion 16*a* has been pivoted collectively with the first triangular portion 17 and the second triangular portion 18 about the predetermined bending axis 19*c* into the position according to FIG. 8.

According to FIG. 8, the mat-shaped portion 16*a* is oriented along a plane corresponding to the plane of the side wall 13*a* in the position shown in FIG. 8.

Figure 9:
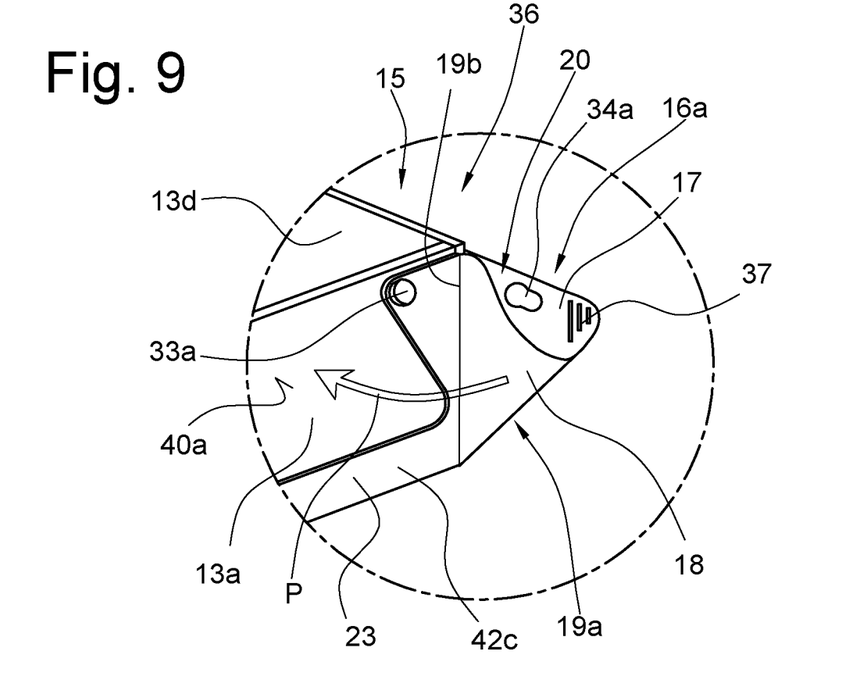
FIG. 9 shows the corner region of the device according to FIG. 8 in a further intermediate position, wherein a mat-shaped portion has been formed between the front side wall and the rear side wall with the beginning of the formation of an overlap as a result of the displacement of the rear side wall into the working position.

Starting from the first intermediate position 35 according to FIG. 8, a second intermediate position 36 as shown in FIG. 9 will now be explained:

Starting from FIG. 8, the side wall 13*d* has been moved from its resting position according to FIG. 8, in which it lies flat, to its upright working position 15 according to FIG. 9. In so doing, the first triangular portion 17 was moved towards the second triangular portion 18. At the same time, the mat-shaped portion 16*a* was folded approximately centrally, along the bending line 19*a*. An overlap 20 begins to form between the first triangular portion 17 and the second triangular region 18.

Figure 10:
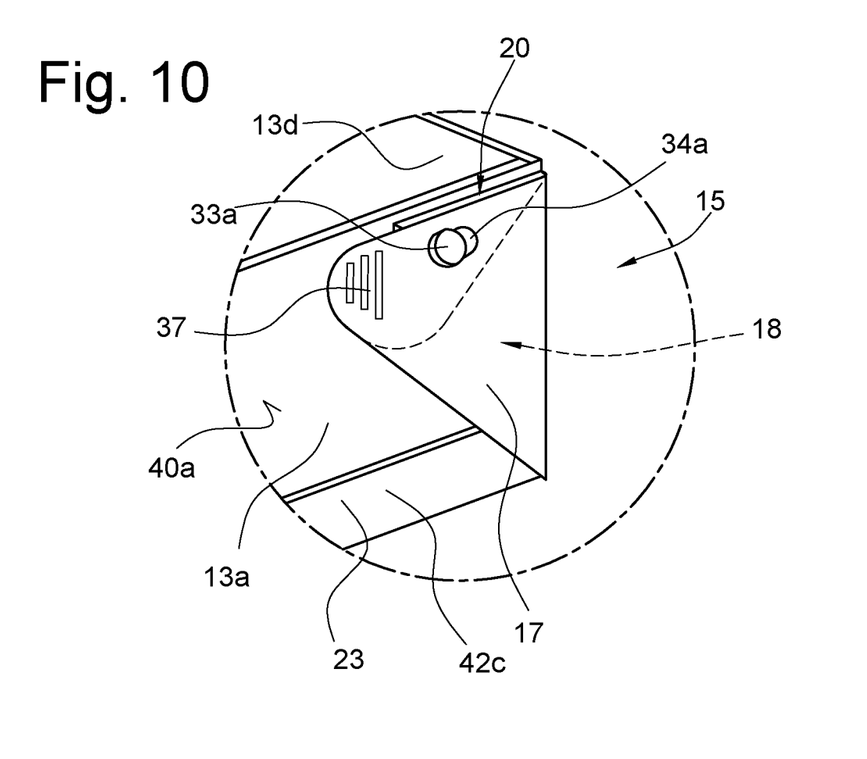
FIG. 10 shows a schematic, perspective view of the corner region of the device according to FIG. 9, wherein the device has reached its use position and a locking element on the front side wall has been engaged with a counter locking element on the rear side wall.

Starting from the second intermediate position 36 according to FIG. 9, the use position of the device 10 according to FIG. 10 can be reached by moving the pocket-like overlap 20 according to FIG. 9 along the arrow P in FIG. 9 about the predetermined bending line 19b towards the side wall 13a. FIG. 10 shows the locked state. In the locked state, the side wall 13d is locked and fixed to the side wall 13a.

Locking is accomplished by a pin-shaped projection engaging as a locking element 33a in a recess 34a, which forms the counter-locking element.

Shown is a ribbed structure 37 that allows easy gripping of the mat-like portion 16a and easy execution of the movement.

Figure 5:
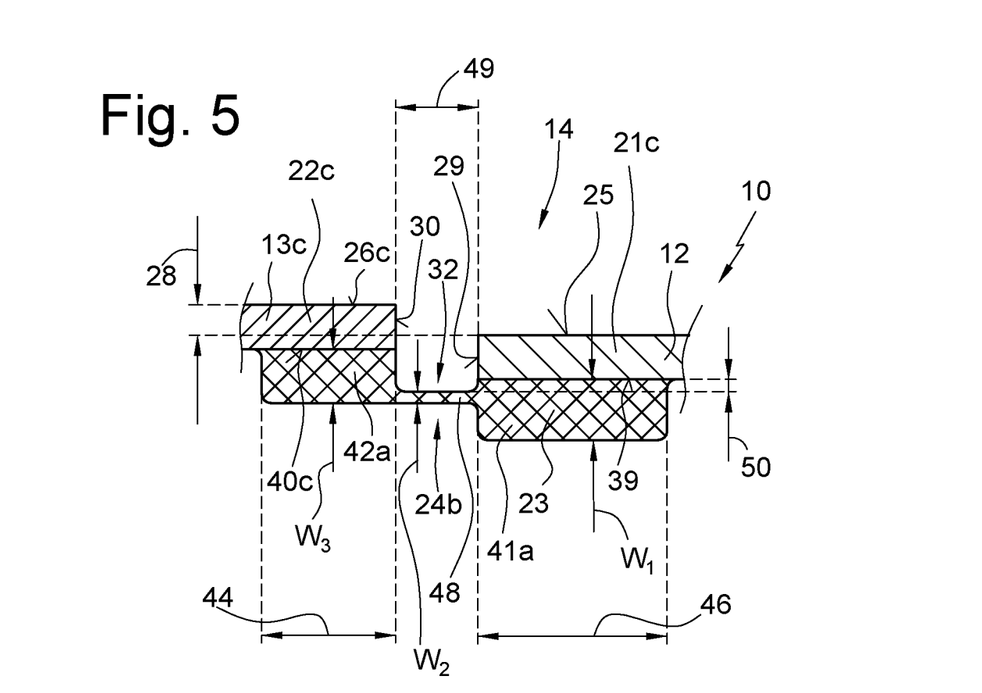
FIG. 5 shows, in a partially cut, schematic, broken-off view, a connection region between a side wall in the rest position and a bottom wall of the device, in a state lying flat, approximately according to the line of section V-V in FIG. 3.

The special feature according to the invention will now be explained with reference to FIGS. 5 and 6:

FIG. 5 shows a connection region 24b of the device 10 between the bottom wall 12 and the side wall 13c, the latter being in the rest position 14.

The plastics compound 23 covers the outer side 39 of the bottom wall 12 and is formed in the manner of a strand 41a. In this respect, the edge portion 21c of the bottom wall 12 is coated by the plastics compound 23. The inner face 25 of the bottom wall 12 is kept completely free of the plastics compound 23.

In particular, the exemplary embodiment of FIG. 5 shows that a narrow side 29 of the bottom wall 21 is also kept free of the plastics compound 23.

The side wall 13c has an edge portion 22c opposite and bordering the edge portion 21c of the bottom wall 12. This edge portion 22c is also coated on its outer face 40c by the plastics compound 23. Here, the plastics compound 23 also forms a strand 42a. The inner face 26c of the side wall 13a is kept completely free of the plastics compound 23.

The two strands 42a, 41a are formed contiguously along the connection region 24b and are connected to each other. In particular, a bridge portion 48 made of plastics compound 23 is provided and connects the two strands 41a, 42 to each other.

The inner face 26c of the side wall 13c and also the narrow-side face 30 of the side face 13c are kept completely free of plastics compound 23.

The narrow side 29 of the bottom wall 12 and the narrow side 30 of the side wall 13c are spaced apart from each other when the side wall 13c is in the rest state. The distance is indicated in FIG. 5 by the reference sign 49.

A groove-shaped gap 32 is associated with the connection region 24b between the bottom wall 12 and the side wall 13c. This is also kept free of plastics compound 23. In particular, the bridge portion 48 is arranged in such a way that, as can best be seen from FIG. 5, it is spaced at a slight distance 50 from the outer face 39 of the bottom wall 12, offset outwards.

The gap 32 provides a clearance that serves as a movement space during the course of the displacement movement of the side wall 13c into its working position, which will be explained later.

It is noteworthy, as shown in FIG. 5, that an offset-like step 28 is arranged between the inner face 26c of the side wall 13c and the inner face 25 of the bottom wall 12 when the device 10 is in the state in which it lies flat according to FIG. 5.

Figure 6:
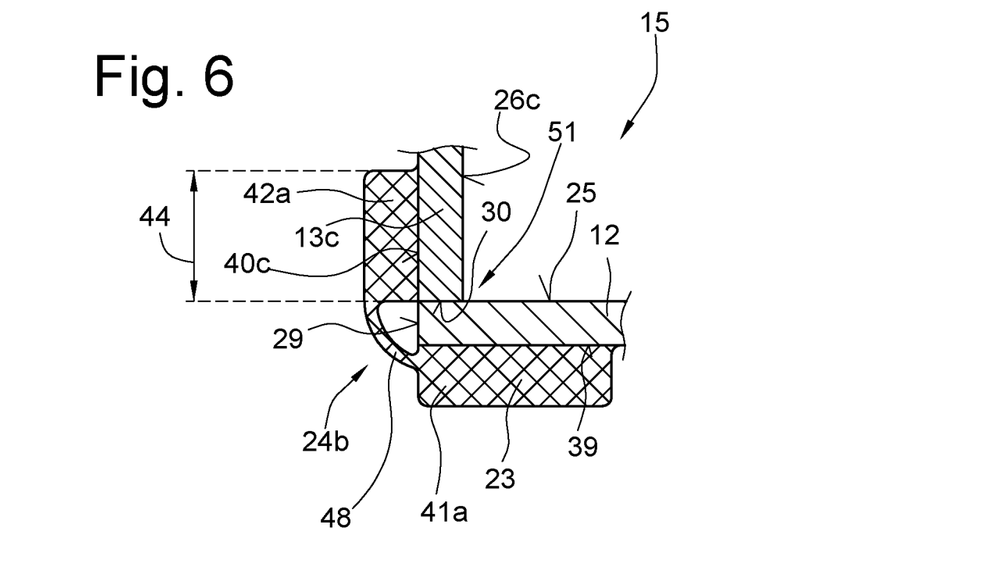
FIG. 6 shows the device in a representation according to FIG. 5, wherein the side wall has been moved from the rest position according to FIG. 5 into a working position according to FIG. 6.

In the device according to the invention, this step 28 facilitates a transfer of the side walls 13a, 13b, 13c, 13d from the rest position 14 according to FIG. 5 into a working position 15 according to FIG. 6.

Due to the step 28, each side wall 13a, 13b, 13c, 13d is raised relative to the bottom wall 12 when the device 10 is in the state in which it lies flat. This makes it easier to place the particular side wall 13a, 13b, 13c, 13d on the bottom wall 12, as described below.

During the course of erecting the side walls 13a, 13b, 13c, 13d, the side wall 13c according to FIG. 5 can be moved into an upright working position 15 according to FIG. 6. In accordance with the invention, when the side wall 13c is in the working position 15, it stands upright with its narrow side 30 on the inner face 25 of the bottom wall 12. Thus, in the corner region 51 (FIG. 6) of the interior of the device 10, metal faces come to rest against each other in abutment.

The corner region 51 of the device 10 is completely free of plastics compound 23 when the device 10 is in the use position according to FIG. 1. This allows the inner face 27 of the baking mold 11 to be provided continuously and completely by metal surfaces.

The term 'metal surface' includes a non-stick coating, as is common in cooking and baking molds.

In particular, for the sake of good order, it should be noted that although such a non-stick coating may also consist of plastic in the broadest sense, it is not considered to be a plastics compound 23 within the meaning of the present invention. A plastics compound 23 within the meaning of the present invention is the material used for fixing the metal walls 12, 13a, 13b, 13c, 13d to each other and allowing their relative movability.

In one exemplary embodiment of the invention, the offset 28 is between 0.2 and 7 mm, preferably about 2 mm.

The distance 50 between the outer faces 40 and the bridge region 48 can be, for example, between 0.01 mm and 3 mm.

The wall thicknesses W1, W2 and W3 of the strands 41a, 42a or of the bridge portion 48 can be a few millimeters. The exact, most suitable wall thickness in each case depends, for example, on the materials used for the plastics compound 23 and on the dimensions of the device 10.

FIGS. 5 and 6 explain the connection region 24b between one side wall 13c, by way of example for all connection regions between each of the side walls 13a, 13b, 13c, 13d, and the bottom wall 12.

Also in the connection regions between each two side walls, for example between the two side walls 13c and 13d, the corresponding corner regions 52 (see FIG. 2) are kept free of plastics compound 23.

Figure 2:
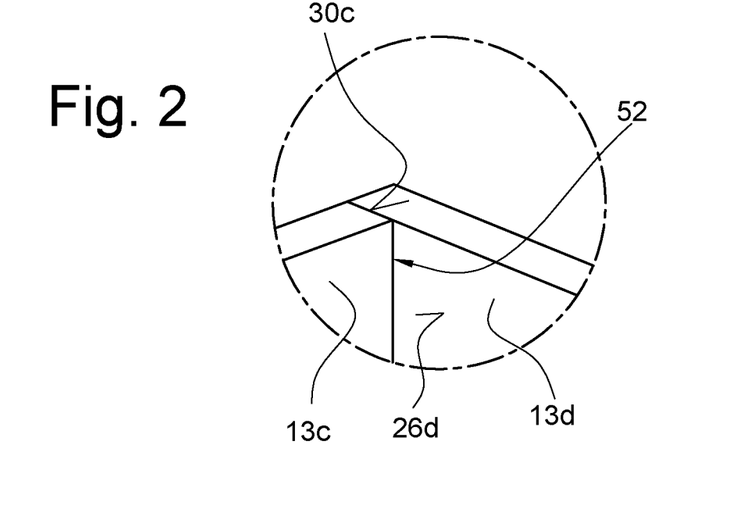
FIG. 2 shows, in a cutaway, schematic, perspective, enlarged, broken-off view, a detail of a corner region of the device from FIG. 1, approximately according to the dashed circle II in FIG. 1.

FIG. 2 shows that the side wall 13c stands with its narrow side 30c on the inner face 26d of the adjacent side wall 13d and contacts said inner face.

Figure 11:
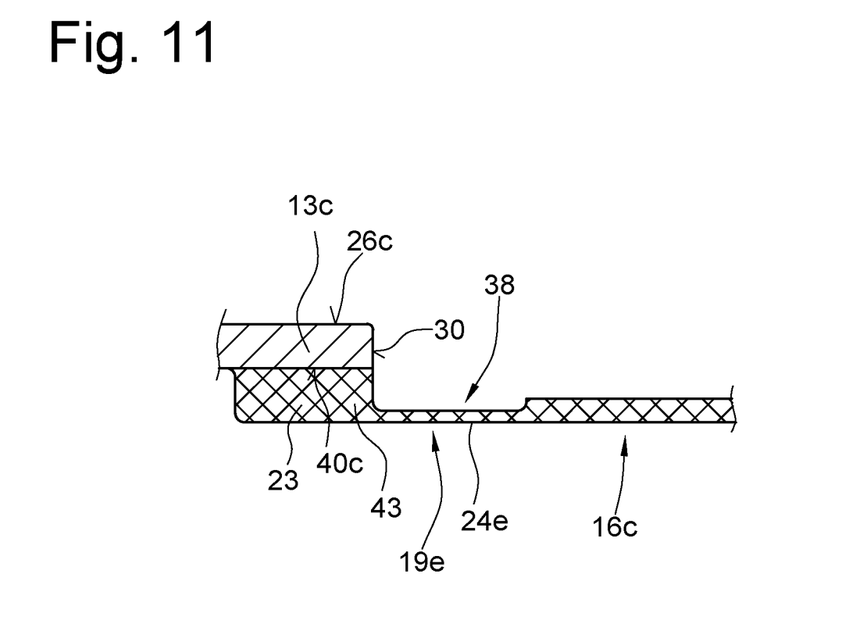
FIG. 11 shows, in a cutaway, schematic, broken-off view, a detail of a connection region between a side wall and the mat-shaped portion in a representation according to FIG. 5, approximately along the line of section XI-XI in FIG. 3.

Referring to FIG. 3 and FIG. 11, the connection region 24c between the side wall 13c and the mat-shaped portion 16c is explained:

FIG. 11 shows that the plastics compound 23 is arranged in the form of a strand-like region 43 only on the outer side 40c of the side wall 13c.

The inner face 26c of the side wall 13c and also the narrow side 30 of the side wall 13c are kept free of plastics compound 23, as shown in FIG. 1.

A clearance 38 is arranged immediately adjacently to the narrow side 30 of the side wall 13c. The connection region 24e between the side wall 13c and the mat-like portion 16c springs back outwards relative to the inner face 26c of the side wall 13c, thereby facilitating a bending movement and folding together. At the same time, the thinly formed connection region 24e forms a predetermined bending region 19e.

The invention claimed is:

1. A device for receiving foodstuffs, like a cooking mold or baking mold, comprising a bottom wall and a plurality of side walls, wherein the side walls are displaceable from a rest position, in which they lie flat relative to the bottom wall into an upright working position, and wherein between two neighboring side walls there is arranged a mat-like portion which forms an overlap when the side walls are in the working position, characterized in that the bottom wall and the side walls are made of metal, wherein the bottom wall along its edge portions and the side walls along their edge portions bordering the bottom wall are covered with a plastic mass, which is arranged on the outer side of the walls and which connects the edge portions of the side walls to the edge portions of the bottom wall, wherein the inner sides of the walls are kept free of plastic mass, and wherein a side wall in its working position is arranged in abutment against the bottom wall and against each adjacently arranged side wall, so that the device in its use position forms an inner face, that is provided continuously by metal faces, and wherein when the device is in the state in which it lies flat, an inner face of an edge portion of a side wall has a step-like offset relative to an inner face of the adjacent edge portion of the bottom wall.

2. The device according to claim 1, characterized in that the plastic mass is provided by a silicone compound, in particular by a silicone rubber.

3. The device according to claim 1, characterized in that, when the device is in the state in which it lies flat, a groove-shaped gap is arranged between a narrow side of an edge portion of a side wall and a narrow side of the bottom wall along the adjacent edge portion of the bottom wall.

4. The device according claim 1, characterized in that the side wall in its use position stands with its narrow side on the inner face of the bottom wall.

5. The device according to claim 1, characterized in that a side wall in its use position stands with its narrow side on the inner face of an adjacently arranged side wall, the latter being in its use position.

6. A device according to claim 1, characterized in that a narrow-side face of the bottom wall is kept free of plastics compound.

7. The device according to claim 1, characterized in that a narrow-side face of the side wall is kept free of plastics compound along its edge portions bordering the bottom wall.

8. The device according to claim 1, characterized in that a narrow-side face of the side wall is kept free of plastics compound along its edge portions bordering an adjacent side wall.

9. A device for receiving foodstuffs, like a cooking mold or baking mold, comprising a bottom wall and a plurality of side walls, wherein the side walls are displaceable from a rest position, in which they lie flat relative to the bottom wall into an upright working position, and wherein between two neighboring side walls there is arranged a mat-like portion which forms an overlap when the side walls are in the working position, characterized in that the bottom wall and the side walls are made of metal, wherein the bottom wall along its edge portions and the side walls along their edge portions bordering the bottom wall are covered with a plastic mass, which is arranged on the outer side of the walls and which connects the edge portions of the side walls to the edge portions of the bottom wall, wherein the inner sides of the walls are kept free of plastic mass, and wherein a side wall in its working position is arranged in abutment against the bottom wall and against each adjacently arranged side wall, so that the device in its use position forms an inner face, that is provided continuously by metal faces, characterized in that locking elements are integrally molded on the outer side of at least two of the side walls.

10. The device according to claim 9, characterized in that the locking elements are provided by the plastics compound.

11. The device according to claim 9, characterized in that the locking elements are formed by pin-shaped projections.

12. The device according to claim 9, characterized in that counter-locking elements for the locking elements are arranged on the portions.

13. The device according to claim 12, characterized in that the counter-locking elements are formed by recesses.

14. A device for receiving foodstuffs, a cooking mold or baking mold, comprising a bottom wall and a plurality of side walls, wherein the side walls are displaceable from a rest position, in which they lie flat, relative to the bottom wall into an upright working position, and wherein between two neighboring side walls there is arranged a mat-like portion, which forms an overlap when the side walls are in the working position, characterized in that the bottom wall and the side walls are made of glass or a ceramic material, wherein the bottom wall along its edge portions and the side walls along their edge portions bordering the bottom wall are covered with a plastic mass, which is arranged on the outer side of the walls and which connects the edge portions of the side walls to the edge portions of the bottom wall, wherein the inner sides of the walls are kept free of plastic mass, and wherein a side wall in its working position is in abutment against the bottom wall and against each adjacently arranged side wall, so that the device in its use position forms an inner face that is provided continuously by portions made of glass or of ceramic material.

\* \* \* \* \*